Feb. 7, 1950 J. BABIN 2,496,256
SEPARABLE RIM
Filed March 9, 1948 2 Sheets-Sheet 1

INVENTOR
Joseph Babin
BY
Synnestvedt & Lechner
ATTORNEYS

Feb. 7, 1950          J. BABIN          2,496,256
SEPARABLE RIM
Filed March 9, 1948          2 Sheets-Sheet 2
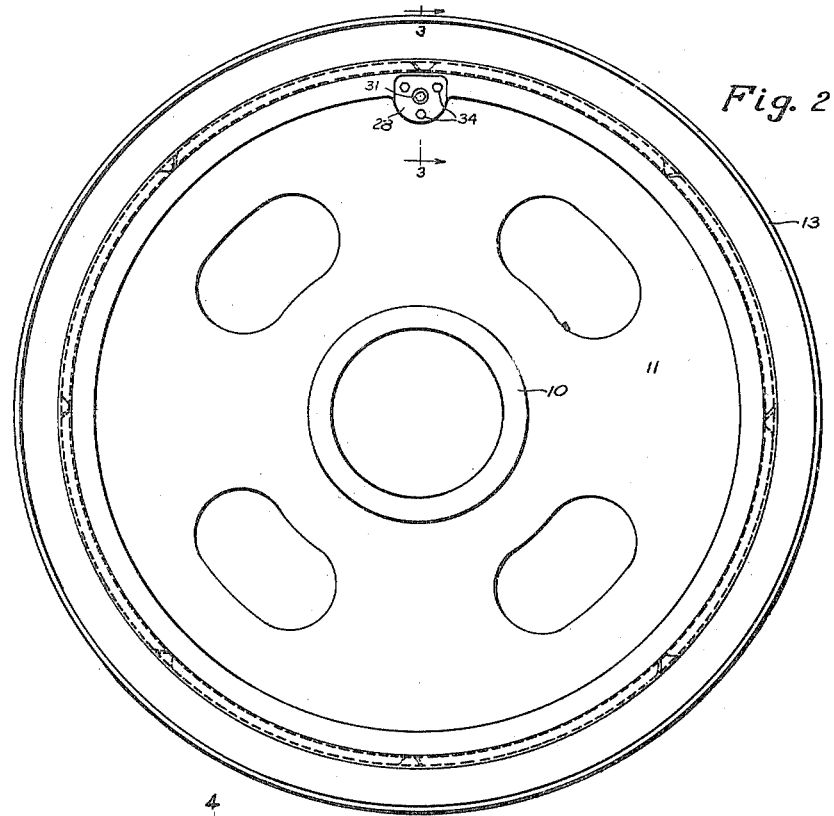
*Fig. 2*
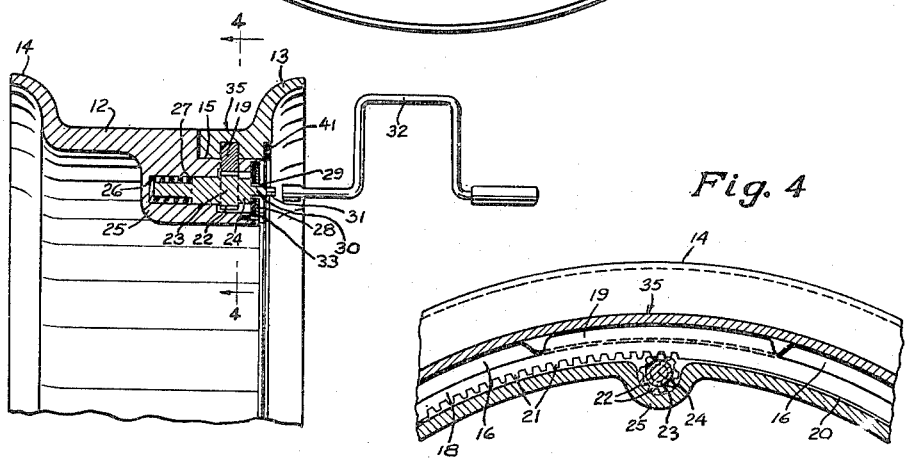
*Fig 3*
*Fig. 4*
INVENTOR.
Joseph Babin
BY
ATTORNEYS.

Patented Feb. 7, 1950

2,496,256

UNITED STATES PATENT OFFICE 2,496,256

SEPARABLE RIM

Joseph Babin, Lutcher, La., assignor of one-third to Cecil E. Bassett, Baton Rouge, La.

Application March 9, 1948, Serial No. 13,834

4 Claims. (Cl. 152—412)

This invention relates to vehicle wheels and is particularly concerned with vehicle wheels of the type which are adapted to cooperate with a removable tire.

More specifically, the invention is related to the type of vehicle wheel which comprises a cylindrical barrel portion onto which a tire may be telescoped and a flange which may be secured to the barrel in a position to retain the tire as against axial movement thereon.

Still more specifically, the invention is concerned with the construction of such a barrel and flange and the mechanism by which the flange is attached and removed from the barrel.

A general object of the invention is to simplify the installation and removal of tires on vehicle wheels.

A more specific object of the invention is to simplify the removal and replacement of a tire-retaining flange.

Another object of the invention is to provide a simple mechanism for securing a tire-retaining flange to the barrel of a vehicle wheel.

A more specific object of the invention is to provide an improved mechanism for securing a tire-retaining flange to a vehicle wheel.

In addition, the invention contemplates a tire-retaining flange which may be attached or released by the manipulation of a single locking element.

A further object of the invention is to maintain a pneumatic tire in position on the wheel, even after a blowout.

How the foregoing and other objects are attained will be more clearly understood upon reference to the description which follows hereinbelow and the drawings, in which:

Figure 2 is an elevational view of the vehicle wheel of Figure 1 on a somewhat smaller scale;

Figure 3 is a sectional view of a portion of the wheel as shown in Figure 2, taken along the line 3—3 in Figure 2; and Figure 4 is a sectional view of a portion of the mechanism taken along the line 4—4 in Figure 3.

Figure 1:
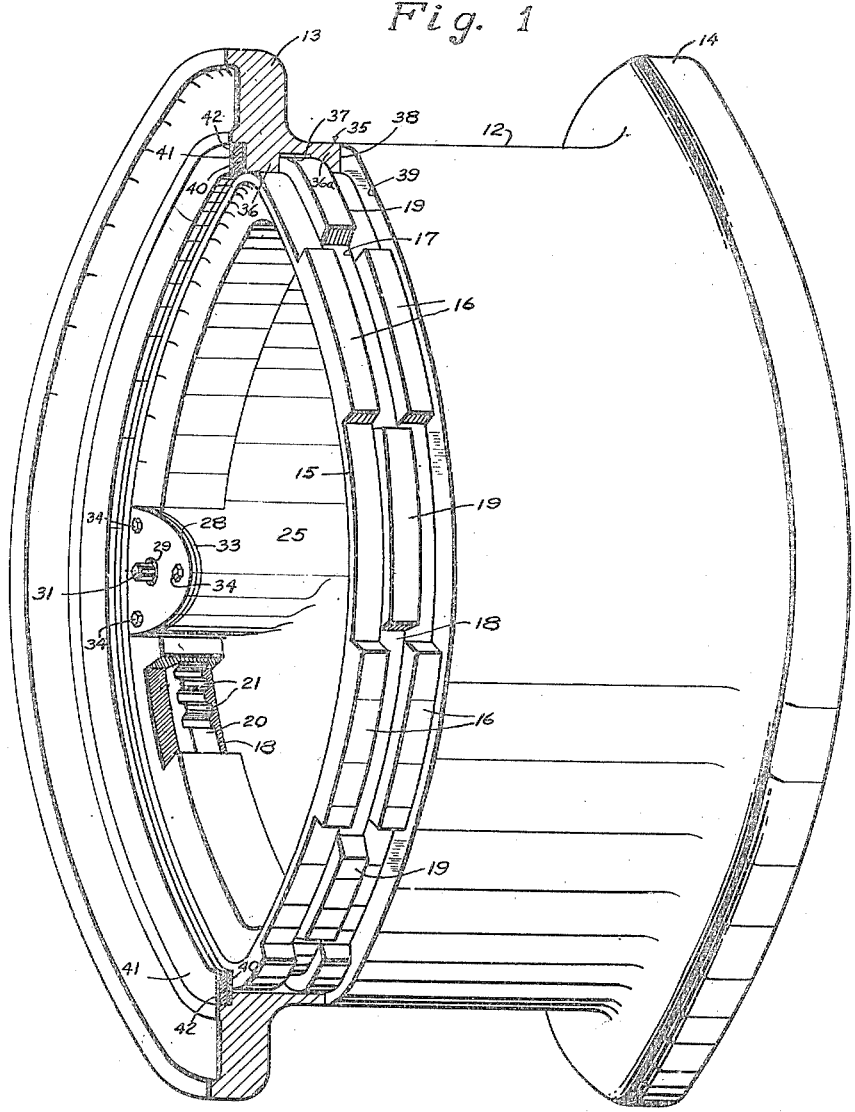
Figure 1 is an isometric projection of a vehicle wheel constructed in accordance with the invention, with portions of the mechanism broken away.

As may be seen in Figure 2, the wheel of the invention comprises a hub 10 and wheel body 11 (both of which may be of conventional construction), a tire-supporting barrel 12 (see Figure 1) and a removable tire-retaining flange 13.

A fixed tire-retaining flange 14 is formed at one end of barrel 12, and at the other end the diameter of the barrel is reduced as indicated at 15. The reduced portion 15 of barrel 12 is splined as at 16, and is also provided with a circumferential slot 17 which intersects splines 16. A ring 18 is mounted for circumferential movement in slot 17 and is provided with projection 19, whose circumferential dimension is comparable to the circumferential dimension of a spline 16.

A portion of the inner surface 20 of ring 18 is provided with teeth 21. As may most clearly be seen in Figure 4, the teeth 21 are in constant mesh with the teeth 22 of a pinion 23, which pinion is mounted for rotation on a shaft 24.

Shaft 24, as may best be seen in Figure 3, is journalled in a housing 25 carried by the inner surface of barrel 12. A spring 26, which abuts at one end against housing 25 and at the other against a shoulder 27 of shaft 24, urges shaft 24 against plate 28, which closes housing 25 at its outer end. Shank 30 of shaft 24 extends through an aperture 29 in plate 28 and terminates in a hexagonal fitting 31 which is adapted to be engaged by a standard tire wrench such as 32. Plate 28 is sealed to housing 25 by means of a gasket 33 and secured to the housing by means of cap screws 34.

It will be seen, therefore, that under normal conditions, shaft 24 is urged against gasket 33, sealing aperture 29. However, the axial pressure on the shaft, incident to the application of a wrench to fitting 31, is sufficient to compress spring 26 slightly and thus reduce the friction between shaft 24 and gasket 33.

It should also be pointed out that the engagement between shaft 24 and gasket 33 is sufficient to prevent rotation of the shaft under ordinary conditions of use, and that when a tire is inflated on the wheel, the axial pressure transmitted through the locking elements will prevent creeping of ring 18.

As will be apparent, particularly from Figure 1, rotation of pinion 23 will effect circumferential movement of ring 18, as a result of which the projections 19 may be shifted from a "locked" position, as indicated in Figure 1, to a "feathered" position, in which projections 19 are axially aligned with splines 16.

Removable flange 13 includes a cylindrical portion, generally indicated at 35, which is internally splined as at 36 in a manner to engage the splines 16 of barrel 12. The internal surfaces of splines 36 are intersected by transverse slots 37 of cross section sufficient to receive projections 19 of ring 18.

Cylindrical portion 35 of flange 13 may be axially slid into telescopic engagement with reduced portion 15 of barrel 12 until the end 38 of cylindrical portion 35 abuts against shoulder 39 of barrel 12, in which relative position of the barrel and flange slots 37 are in alignment with slot 17.

It will be clear that relative circumferential displacement between barrel 12 and separable flange 13 is prevented by splines 16 and 36, and it will also be clear that relative axial movement between the flange and barrel can readily occur when projections 19 are in the "feathered" position. However, after the flange has been positioned on the barrel, ring 18 and projections 19 may be moved to the "locked" position, at which time projections 19 will engage slots 37 in splines 36. Relative axial movement of members 12 and 13 will now be prevented, since the proximate surface 38 of the proximate portion 36—a of spline 36 abuts shoulder 39 of barrel 12, and the distal surface of the proximate portion 36—a of spline 36 abuts the distal surface of projection 19 of ring 18, the term "proximate" being used to identify surfaces on one member disposed toward the other member, and the term "distal" being applied to surfaces on one member facing away from the other member.

Shifting of ring 18 is readily accomplished by the application of a tire wrench such as 32 to fitting 31, followed by rotation thereof. It will be seen, therefore, that by the manipulation of a single element, namely, fitting 31, flange 13 may be securely locked to barrel 12 and that it may be as simply removed.

In order to seal the locking mechanism against the entry of dirt and water, I have provided a gasket 40 which is adapted to overlie the joint between barrel 12 and flange 13. Gasket 40 is retained in its position by a ring 41 which, in turn, is retained in its position by frictional engagement with the surface 42 of flange 13.

It should be pointed out that the teeth 21 extend along the interior surface of ring 18 for a distance just sufficient to provide for shifting ring 18 from a fully "feathered" position to a fully "locked" position. Accordingly, guesswork as to the position of the ring 18 is eliminated, since rotation of the pinion 23 until the end of the toothed portion of ring 18 is reached will locate the ring in either the fully "feathered" or fully "locked" position. In addition, locking is always associated with one direction of rotation of fitting 31 and feathering with the other. In the organization illustrated in Figure 1, it will be seen that clockwise rotation of fitting 31 will "feather" the locking mechanism, and that the mechanism is locked upon counter-clockwise rotation of fitting 31.

Thus, according to the invention, a tire may be mounted or removed by performing the following steps: rotating fitting 31 and thereby effecting "feathering" of the locking mechanism; removing separable flange 13; removing or mounting the tire; replacing flange 13; and locking the flange to the barrel by an opposite rotation of fitting 31.

I claim:

1. A vehicle wheel comprising a cylindrical barrel and a tire-retaining member axially separable therefrom, said member being characterized by a cylindrical surface adapted to slidingly engage a complementary cylindrical surface on the barrel and by a protuberance projecting radially from said first surface adjacent an end thereof, an annular slot in said second surface, a ring circumferentially movable in said slot, a radial projection on said ring adapted to engage the surface of said protuberance opposite said end, and mechanism for shifting said ring circumferentially to effect such engagement.

2. A vehicle wheel comprising a tire-supporting barrel, an annular tire-retaining flange at one end of the barrel, a cylindrical splined surface at the other end of the barrel, an annular slot in said splined surface, a circumferentially movable ring in said slot, projections on said ring of circumferential dimension comparable to the circumferential dimension of the splines, a separable tire-retaining flange having a second splined cylindrical surface adapted to telescopically engage said first surface, a shoulder on one of said separable members for limiting telescopic engagement with the other, a second annular slot in said second surface intersecting the splines thereof and adapted to be aligned with said first slot upon telescopic engagement of said members, and mechanism for circumferentially shifting said ring to and from a position in which the projections thereon engage said second slot in the area of intersection of the splines on said separable flange by said second slot.

3. A construction in accordance with claim 2 and further including teeth on said ring, a pinion in engagement with said teeth and means for rotating said pinion to effect circumferential movement of said ring.

4. A vehicle wheel comprising a cylindrical barrel adapted to support a tire, one end of said cylinder comprising an externally splined cylindrical surface of reduced diameter relative to the tire-supporting portion of said barrel, an annular slot in said surface intersecting said splines, a circumferentially movable ring in said slot having raised portions thereon of spacing and dimensions comparable to the spacing and circumferential dimensions of the splines, teeth on the radially internal surface of said ring, a pinion in engagement with said teeth; and a removable tire-retaining flange having a cylindrical internally splined surface adapted to telescopically engage said first surface, an annular slot intersecting the splines of said second surface, and a stop for limiting telescopic movement of said barrel and said separable flange to a degree of engagement bringing said two slots into alignment, whereby circumferential movement of said ring shifts the projections thereon into the slots intersecting the splines on said second surface.

JOSEPH BABIN.

REFERENCES CITED

The following references are of record in the file of this patent:

UNITED STATES PATENTS

| Number | Name | Date |
|---|---|---|
| 877,726 | Nordlund | Jan. 28, 1908 |
| 1,180,724 | Johnston | Apr. 25, 1916 |
| 1,373,009 | Kunert | Mar. 29, 1921 |
| 1,389,496 | Fak | Aug. 30, 1921 |
| 1,406,920 | Bolenbaugh et al. | Feb. 14, 1922 |
| 1,433,179 | Howell | Oct. 24, 1922 |
| 1,520,810 | Copithorn | Dec. 30, 1924 |
| 1,837,574 | Mulhern et al. | Dec. 22, 1931 |

FOREIGN PATENTS

| Number | Country | Date |
|---|---|---|
| 233,673 | Great Britain | 1925 |